Nov. 15, 1960 R. H. HILL 2,959,927
CONVERTER METHOD AND APPARATUS
Filed May 8, 1957
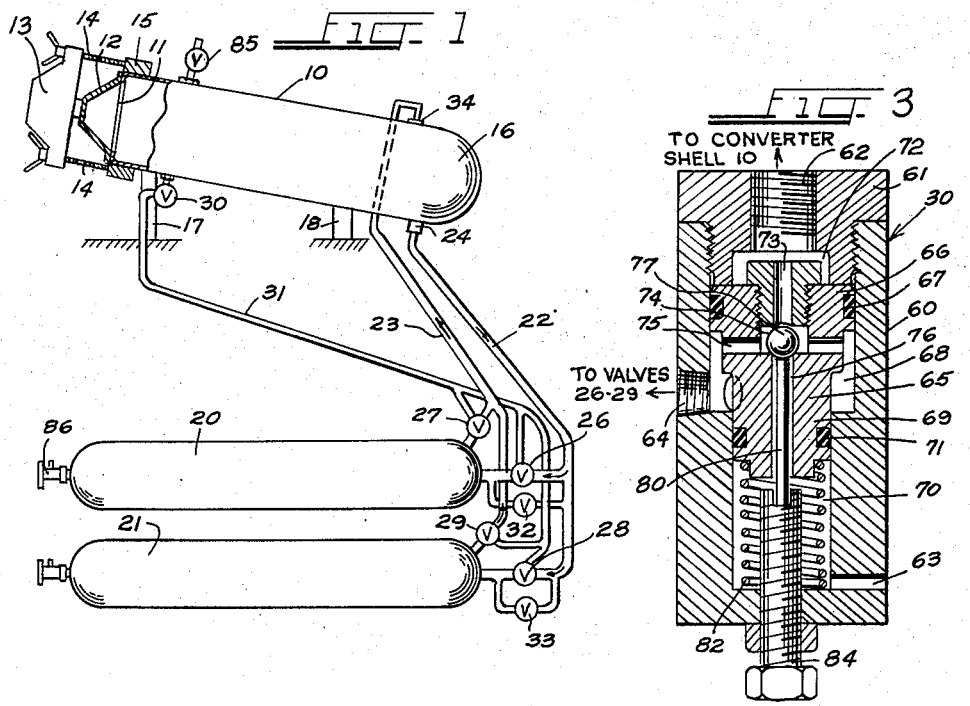
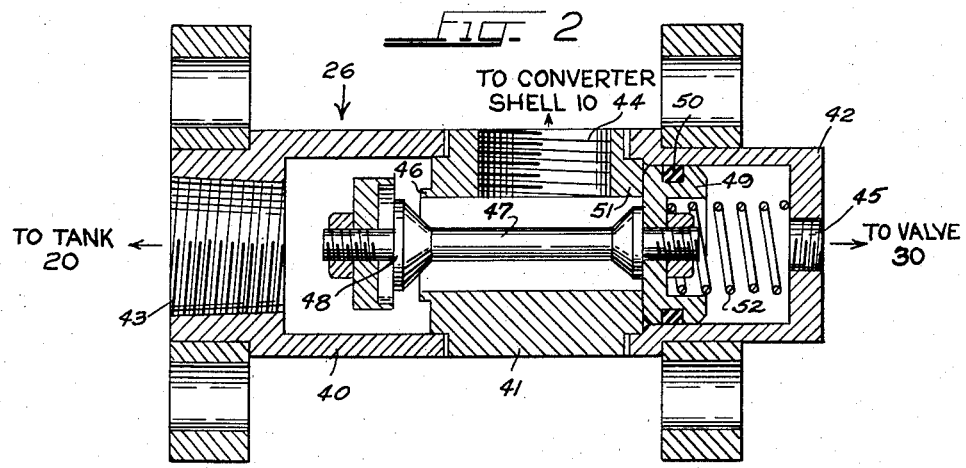
INVENTOR.
ROBERT H. HILL
BY Wallace and Cannon
ATT'YS.

United States Patent Office 2,959,927
Patented Nov. 15, 1960

2,959,927
CONVERTER METHOD AND APPARATUS

Robert H. Hill, Rte. 2, Box 36A, Elgin, Ill., assignor to Robert H. Hill and Harold Hoffman, both of Elgin, Ill.

Filed May 8, 1957, Ser. No. 657,772

13 Claims. (Cl. 62—46)

This invention relates to a new and improved method and apparatus for converting materials from solid to fluid phase. More particularly, the invention relates to a new and improved method and apparatus for converting carbon dioxide or other similar materials from a solid state to a gaseous state and for storing the material after conversion. The invention also relates to a new and improved snap-action control device which may be employed as as part of the converter system.

Some materials which are ordinarily utilized in their gaseous or liquid state in commercial, industrial, and other processing are most conveniently transported in their solid state. The most important of these materials, from an economic standpoint, is carbon dioxide. Carbon dioxide is utilized in a wide variety of commercial and industrial processes, usually in the form of a gas but sometimes in liquid form. Transportation costs for the carbon dioxide are extremely high if it is shipped in gaseous form in sealed containers; on the other hand, the transportation costs are very much less if the carbon dioxide is transported in its solid form, sometimes referred to colloquially as "Dry Ice." Consequently, it is customary to ship the carbon dioxide in solid phase and to convert it to fluid phase at the location where it is to be utilized.

The conventional carbon dioxide converter comprises a container or converter shell which may be charged with solid carbon dioxide and then sealed, the carbon dioxide being permitted to melt and then vaporize or to sublimate to form the desired gas for processing. The converter system may include one or more storage tanks in addition to the initial container. All of these tanks, including the original converter shell, must be constructed to withstand the ultimate gas pressure developed within the system. Converter systems of this kind have been satisfactory for relatively small-volume applications, but present relatively serious problems when applied to large-volume storage arrangements. The principal difficulty involved is the requirement for a relatively large high-pressure converter shell having a large opening therein to permit charging of the system with solid carbon dioxide. The closure members for such converter shells are extremely heavy and expensive, since they must afford a complete hermetic seal for the container and must also be capable of withstanding extremely high pressures of the order of 1000 pounds per square inch.

A primary object of the invention, therefore, is a new and improved method of converting carbon dioxide or like material from solid to fluid phase without requiring the use of a large high pressure container.

Another primary object of the invention is a new and improved solid-to-fluid converter apparatus for carbon dioxide or like material which permits high pressure storage without requiring the entire converter system to withstand the ultimate storage pressure.

Another object of the invention is a new and improved method of converting carbon dioxide or like material from solid to fluid phase which permits the charging of a plurality of high pressure storage tanks from a single low pressure converter shell.

A further object of the invention is a new and improved method of converting carbon dioxide or like material from solid to fluid phase which utilizes the inherent properties of the material to protect an initial low pressure charging container against high pressures which might otherwise be developed by vaporization of the material.

An additional object of the invention is a new and improved method and apparatus for converting carbon dioxide or like material from solid to vapor phase which permits operation of the converter apparatus as a closed system during the initial stages of conversion yet allows dissociation of the storage tanks of the system from the charging portion thereof during the final or vaporization stage without entailing substantial loss of the vaporized material.

A further object of the invention is a solid-to-fluid converter for carbon dioxide or like material which facilitates charging of the converter by materially reducing the pressure requirements on the initial portion of the converter as compared with previously known arrangements.

Another object of the invention is a solid-to-fluid converter for carbon dioxide or like material which is simple and economical in construction and simple to operate yet which affords high capacity storage under relatively high pressures.

A corollary object of the invention is a converter for carbon dioxide or like material which utilizes the inherent properties of the material to control transmission of the material from a first container, in which it is received in solid state, to a second container.

In its method aspect, the invention relates to a method of converting carbon dioxide or like material from solid phase to fluid phase, usually to vapor phase. This method comprises the steps of depositing the solid material to be converted in a first container and draining the material in liquid phase, as it melts, into a second or storage container. Preferably, the liquified material is drained into the storage container by gravity. At the same time, vaporized material is drained from the second container to refrigerate that container and maintain both containers approximately at the triple-point pressure and temperature of the material until all of the solid material is converted to fluid phase. The second container is sealed off from the first when the pressure in the containers exceeds a predetermined threshold value effectively exceeding the triple-point pressure of the material, leaving virtually all of the material stored in the second container in fluid phase.

In its apparatus aspect, the invention relates to a solid-fluid converter for carbon dioxide or like material; a converter constructed in accordance with the invention comprises a low pressure container for receiving a charge of solid material and a high pressure fluid storage tank. A pair of conduits interconnect the low pressure container and the storage tank, one of these conduits being adapted to drain liquid material from the low pressure container into the storage tank. A pair of valves are interposed in these conduits, these valves being actuatable from a normal open condition to a closed condition. The converter further includes means for actuating the valves from open condition to closed condition in response to an increase in pressure within the low pressure container to a predetermined threshold value effectively exceeding the triple-point pressure of the material being stored.

Operation of the converter apparatus of the invention is dependent to some extent upon the pressure developed within the converter system. For most efficient operation, and to prevent loss of more than a very minor portion of the converted material, it is highly desirable that the low pressure container or converter shell be cut off from the storage tank or tanks of the system as soon as all of the material has been changed to fluid phase. Otherwise, a substantial portion of the material may be left in the low pressure container and is lost when the container is subsequently open to receive the next charge of solid material. Conventional pressure-sensitive valves are not particularly well suited for the control of the converter, since they tend to close gradually with increases in pressure.

A further object of the invention, therefore, is a new and improved snap-action control device which acts rapidly to effect a control operation when subjected to pressures above a predetermined threshold value.

Another object of the invention is a new and improved snap-action control device which remains essentially unaffected by pressures up to a given threshold value but which changes its operating condition virtually instantaneously when subjected to a pressure above that value.

A corollary object of the invention is a snap-action pressure responsive control device which is simple and economical in construction yet which affords a positive and rapid control action.

A snap-action control device constructed in accordance with this aspect of the invention comprises a cylinder having a pressure port and a vent port. A piston is disposed within the cylinder and defines therewith three separate chambers; these chambers include a pressure chamber opening into the pressure port, a vent chamber opening into the vent port, and a transition chamber which is interconnected with the pressure and vent chambers by fluid passageways extending through the piston. The piston is movable from a normal position through an intermediate position toward an actuated or control position in response to an increase in fluid pressure in the pressure chamber. A valve closure member is disposed within the fluid passageways of the piston. This valve closure member is actuatable between a normal position in which the transition chamber is connected to one of the vent and pressure chambers and is sealed off from the other and an actuated position in which the transition chamber connections are reversed. The control device further includes means for actuating the valve closure member toward its actuated position in response to movement of the piston to its intermediate position to increase the effective piston area of the vent chamber and thereby accelerate movement of the piston toward its second operating position when the pressure within the pressure chamber reaches a given threshold value.

Other and further objects of the present invention will be apparent from the following description and claims and are illustrated in the accompanying drawing which, by way of illustration, shows a preferred embodiment of the present invention and the principles thereof and what is now considered to be the best mode for applying those principles. Other embodiments of the invention embodying the same or equivalent principles may be used and structural changes may be made as desired by those skilled in the art without departing from the present invention and the purview of the appended claims.

In the drawings:

Fig. 1 is a simplified elevation view, partly schematic, of aa solid-to-fluid converter constructed in accordance with one embodiment of the invention;

Fig. 2 is a cross sectional view of one type of control valve which may be employed in the embodiment of Fig. 1; and Fig. 3 is a sectional view of a snap-action control device which may be utilized in a preferred embodiment of the invention to control the operation of the valve of Fig. 2.

The carbon dioxide converter illustrated in Fig. 1 comprises a preferred embodiment of one apparatus aspect of the invention and is utilized herein to explain the method concept of the invention. The converter comprises a low pressure container or converter shell 10 having a relatively large opening 11 at one end to permit introduction of a charge of solid carbon dioxide thereinto. The open end 11 of the converter shell is closed by a lid 12 which is releasably sealed to the converter shell by suitable means such as a clamping member 13 and a plurality of clamp bolts 14 which extend from the member 13 and are threaded into a collar or other bearing portion 15 of the low pressure container. As indicated in Fig. 1, the converter shell 10 is preferably mounted at an angle such that the end 16 of the shell opposite opening 11 is somewhat lower than the opening. In the illustrated embodiment, the converter shell is supported upon a pair of brackets 17 and 18 and is inclined only at a slight angle from the horizontal; this angle is not critical, however, as is explained more fully hereinafter.

The converter apparatus further includes at least one high pressure fluid storage tank; in the embodiment of Fig. 1, two such storage tanks 20 and 21 are provided. A pair of conduits 22 and 23 interconnect the low pressure container 10 with the storage tank 20 and, in the illustrated multi-tank storage arrangement, with the additional storage tank 21. The conduit 22 is positioned to drain liquid material from the low pressure container 10 to the storage tanks, the inlet opening 24 for this conduit being located at the bottom of the lower end 16 of the low pressure container.

A pair of valves 26 and 27 are interposed in the conduits 22 and 23 respectively between the converter shell 10 and the first storage tank 20. Similarly, a pair of valves 28 and 29 are interposed in the conduits 22 and 23 between the low pressure container and the high pressure storage tank 21. Each of the valves 26—29 is actuatable from a normal open condition to a closed condition, as is explained more fully hereinafter. The converter system of Fig. 1 further includes a means for actuating each of the valves 26—29 from its normal open condition to its closed condition in response to an increase in pressure within the converter shell 10 to a predetermined threshold value. This means comprises a pressure-responsive snap-action control valve 30 which is connected by a conduit 31 to each of the valves 26—29. The embodiment of Fig. 1 also includes a bleeder valve 32 which is connected in the system in parallel with the valve 26 and a similar bleeder valve 33 which may be employed to bypass the valve 28.

It is by no means essential that all of the apparatus illustrated in Fig. 1 be employed to carry out the inventive method; on the other hand, this apparatus may be conveniently utilized in explaining the inventive method. Thus, in its method aspect, the invention is directed to a method for converting carbon dioxide or like material from solid to fluid phase and the first step of the method is to deposit the solid material to be converted in a first container, in this instance the low-pressure converter shell 10. The converter shell is then sealed by closing the lid 12 and clamping the lid in place by means of the clamping member 13 and the clamp bolts 14. The carbon dioxide or other like material begins to sublimate and to melt; usually both of these actions take place at the same time. The melted carbon dioxide is drained into a second container, which in this instance may constitute the storage tank 20. The melted material also tends to vaporize within the tank 20.

It is essential to the operation of the invention that both of the containers 10 and 20 be maintained approximately at the triple-point pressure and temperature of the material being stored during the conversion operation in order that most of the material may be melted and deposited in the storage tank 20 in liquid form. Consequently, vaporized carbon dioxide is continuously drained from the second container or storage tank 20 to refrigerate that container and maintain both of the containers 10 and 20 at the triple-point pressure and temperature. In the apparatus embodiment of Fig. 1, this is accomplished by draining the vaporized carbon dioxide from the tank 20 through the conduit 23. To avoid loss of this vaporized carbon dioxide, it is preferably returned to the first container 10 and condensed upon the solid carbon dioxide remaining in the converter shell. For this purpose, the outlet opening 34 for the conduit 23 is preferably located immediately adjacent the inlet opening 24 for the conduit 22.

The conversion process continues, without mechanical pumping or other application of external pressure to the system, until all of the solid carbon dioxide has melted. When this has been accomplished, virtually all of the carbon dioxide is deposited in the tank 20 in liquid form, although a certain minor portion is present in the tank and in the remainder of the system in vapor phase. This being the case, it is no longer possible to maintain the system at the triple-point pressure and temperature without external refrigeration. Consequently, the liquid material in the tank 20 continues to vaporize and the internal pressure of the converter increases substantially. As soon as the pressure increases to an extent sufficient to afford a positive indication that the conversion process has been completed, the storage tank 20 is sealed off from the container 10 by closing valves 26 and 27, leaving the major portion of the carbon dioxide stored in the tank 20 in fluid phase. Eventually, continued vaporization of the liquid portion of the fluid carbon dioxide in tank 20 may raise the internal pressure of that tank to a value many times higer than the triple-point pressure; for example, the ultimate gas storage pressure may be of the order of 1000 pounds per square inch as compared to the triple-point pressure of approximately 75 pounds per square inch absolute.

It should be noted that the conversion method of the invention may be carried out completely with ordinary manually operated valves. A suitable gauge may be connected to either of the two containers 10 and 20 to afford an indication of the internal pressure in the system and to indicate when that pressure rises above the triple-point pressure, at which time the valves 26 and 27 may be closed manually to seal off the container 20 and complete the conversion operation. Thus, the method may be carried out by hand and does not require automatic control equipment.

It is highly desirable, on the other hand, to afford some means for automatically and instantaneously sealing off the storage tank 20 from the remainder of the system as soon as the pressure in the system reaches a predetermined threshold value only slightly higher than the triple-point pressure of the carbon dioxide, since in this way the converter may be operated most simply and efficiently. For this reason, the line valves 26 and 27 are preferably constructed as fluid-pressure controlled devices and are actuated by the pressure-responsive control valve 30 to seal off the container 20 as soon as the tank 10 reaches a pressure effectively exceeding the triple-point pressure. This aspect of the invention may best be understood by first considering the valve structures illustrated in Figs. 2 and 3.

Fig. 2 shows the line valve 26 in cross sectional detail; this figure may also be considered to represent any of the other similar valves 27, 28, and 29. The valve 26 comprises a casing including a first end section 40, a central section 41, and a further end or control section 42. In valves 26 and 28, end section 40 comprises the inlet section of the valve and central section 41 the outlet portion thereof; in valves 27 and 28 this inlet-outlet relationship is reversed. The outlet section 40 of the valve 26 is preferably provided with a threaded opening 43 which may be connected to the portion of the conduit 22 leading to the storage tank 20. The central portion 41 of the valve is provided with a similar threaded opening 44 to afford a convenient means for connecting the valve to that portion of the conduit 22 leading to the converter shell 10. The other end section 42 of the valve 26 is provided with a threaded opening 45 into which the conduit 31 from the control valve 30 may be fitted.

The central section 41 of the valve 26 is of somewhat smaller internal diameter than the end sections 42 and 43 and is provided at one end with a valve seat comprising a shoulder 46 facing the end section 40 of the valve. A valve stem 47 extends longitudinally through the central portion of the valve section 41. One end of the valve stem 47 supports a suitable valve head 48 which is adapted to engage the valve seat 46 and thereby seal off the central portion 41 of the valve 26 from the end portion 40 thereof. A piston 49 is affixed to the other end of the valve stem 47. The piston 49 is preferably provided with a suitable sealing ring or packing 50 engaging the internal surface of the valve section 42. With the valve 26 in its normal open condition, as illustrated in Fig. 2, the piston 49 is in engagement with a shoulder 51 on the central valve section 41, being biased toward that position by means of a suitable spring 52 which extends from the piston 49 into engagement with the rear wall of the valve section 42.

As indicated in Fig. 2, the valve 26 is a normally open one but may be actuated to a closed condition by movement of the valve stem and piston structure therein to bring the valve head 48 into engagement with the valve seat 46. The spring 52 is effective to maintain the valve in the illustrated open condition so long as the pressure within the three valve sections 40, 41 and 42 is substantially equal. If, on the other hand, the pressure within the valve sections 40 and 41 exceeds that in section 42 by a substantial amount, the piston 49 is driven to the right, as seen in Fig. 2, bringing the valve head 48 into engagement with the valve seat 46 and thereby sealing off the valve section 40 from the valve section 41.

Fig. 3 shows the snap-action control valve 30 in cross sectional detail. The valve 30 comprises a cylinder 60 which is closed at one end by a cap member 61 threaded into the main cylinder member. A pressure port comprising a threaded opening 62 is provided in the cap member 61 and leads into the cylinder 60; the pressure port 62 is utilized to connect the control valve to the converter shell 10. The cylinder 60 is also provided with a vent port 63 which in this embodiment of the device is vented directly to the atmosphere. Cylinder 60 is further provided with an opening 64 which connects the control valve to the conduit 31 leading to the valves 26—29.

A piston member 65 is disposed within the cylinder 60. The large-diameter or head portion 66 of the piston is provided with a suitable packing or sealing ring 67 which seals this portion of the piston to the internal wall of a large diameter opening 68 in the cylinder 60. The lower portion 69 of the piston is similarly sealed to the internal surface of a reduced diameter section 70 of the cylinder by means of a suitable packing or sealing ring 71. Thus, the piston and the cylinder effectively define three separate chambers within the cylinder, a pressure chamber 72 above the head portion 66 of the piston, the vent chamber 70 at the opposite end of the piston, and the transition chamber 68 adjacent the central portion of the piston.

The piston 65 is provided with a first fluid passageway 73 which leads from the pressure chamber 72 into a central valve chamber 74 within the piston. The valve chamber 74, in turn, communicates with the transition chamber 68 by means of one or more fluid passageways 75 and with the vent chamber 70 by means of a further fluid passageway 76. A valve closure member 77 is disposed within the chamber 74 and normally is biased toward the position shown in Fig. 3, in which the closure member is seated at the opening of the fluid passageway 76 into the valve chamber. In the illustrated embodiment, this biasing effect is achieved simply by mounting the valve in the position shown so that gravity maintains the valve closure ball 77 in the desired position, sealing off the vent chamber 70 from the transition chamber 68 and from the pressure chamber 72. Suitable spring biasing means may be utilized for this purpose if desired.

The snap-action control valve 30 is also provided with an actuating means comprising a rod 80 which is mounted in adjustable fixed relation to the cylinder 60 and which extends upwardly through the fluid passageway 76 toward the valve closure member 77. When the valve 30 is in its normal or unactuated condition, the rod 80 does not contact the ball but is spaced a relatively small distance therefrom. The piston 65 of the valve is biased toward the normal or unactuated position as shown in Fig. 3 by means of a suitable spring 82 which engages the lower end of the piston and the rear wall of the cylinder 60.

The snap-action control valve 30 affords an extremely rapid control action in response to an increase in the pressure within the pressure chamber 72 above a predetermined threshold value. In considering operation of this device, it may be assumed at the outset that the pressure within chamber 72 is equal to that within the transition chamber 68, since the converter shell 10 is maintained at the same pressure as the storage tanks 20 and 21 and therefore at the same pressure as the internal pressure of the valves 26—29 during operation of the converter of Fig. 1. The effective piston area facing the pressure chamber 72, however, is substantially larger than that facing the transition chamber 68. Consequently, the piston 65 may be moved downwardly through the cylinder 60, as seen in Fig. 3, by an increase in pressure in the chamber 72 with respect to the atmospheric pressure of vent chamber 70, despite the fact that the pressure within the transition chamber 68 may increase by the same amount. Consequently, when the converter is placed in operation and the solid carbon dioxide begins to vaporize, the consequent increase of pressure within the converter system causes the piston 65 to move downwardly against the biasing force afforded by the spring 82. The spring 82, however, is made strong enough to prevent the piston 66 from moving through a distance sufficient to bring the valve closure member 77 into contact with the actuating rod 80 so long as the pressure within the converter does not substantially exceed the triple-point pressure of the carbon dioxide. Thus, although the piston is moved to some extent during the initial stages of operation of the converter, it does not change materially from the normal or unactuated condition illustrated in Fig. 3 as long as the system remains approximately at the triple-point pressure.

As soon as the pressure within the container 10 rises substantially above the triple-point pressure, however, as occurs when all of the carbon dioxide has been converted to fluid phase, the piston 65 again starts to move in a downward direction through the cylinder 60. This continued movement of the piston brings the valve closure member 77 into contact with the actuating rod 80 and unseats the valve closure member from its normal position. As a consequence, the transition chamber 68 is opened to the vent chamber 70, materially reducing the pressure within the transition chamber, and, in effect, increasing the piston area facing the vent chamber. This effective increase in the piston area markedly accelerates the movement of the piston 65 toward its actuated position. The piston continues its downward movement at a much greater speed and brings the valve closure member 77 into engagement with the lower end of the fluid passageway 73, sealing off that passageway from the remainder of the valve. Consequently, there is no longer any means for maintaining a pressure differential between the transition chamber 68 and the vent chamber 70, and the transition chamber 68 and its connecting conduit 31 (Fig. 1) are reduced to atmospheric pressure.

It is this reduction in pressure in the transition chamber 68 of control device 30 which actuates the valve 26 of Fig. 2 and the corresponding valves 27—29 of the converter system. As indicated hereinabove in the description of valve 26, the line valve 26 is actuated from its normal open condition to closed condition by a reduction in the pressure within the valve section 42 relative to the pressure within the valve sections 40 and 41. As soon as the conduit 31 is vented to the atmosphere as described hereinabove, the internal pressure of the converter system closes the valve 26 and effectively seals off the converter shell 10 from the tank 20, the valve 27 being similarly and simultaneously closed.

In the processing of carbon dioxide, as indicated above, the triple-point pressure at which the converter system is operated during transfer of the carbon dioxide from the shell 10 to the storage tank 20 is approximately 75 pounds per square inch absolute or approximately 60 pounds per square inch gauge, the triple-point temperature being −69.9° F. The threshold value for actuation of the snap-action control valve 30 may be established at any desired value effectively triple-point pressure; satisfactory operating results have been achieved with the control valve set for actuation at approximately 100 pounds per square inch absolute. This setting of the valve may be readily adjusted by varying the extent to which the actuation rod 80 projects into the fluid passageway 76; for this reason, the actuation rod is preferably affixed to a mounting member 84 which is threaded into the rear or bottom wall of the valve cylinder to afford a convenient means for adjusting the valve.

It is also desirable to provide a safety valve for the converter shell 10 to prevent a build up of excessive pressure within that container in the event of failure of some portion of the control system; thus, a conventional relief valve 85 may be suitably connected to the converter shell. This relief valve should be set to open at a pressure somewhat higher than selected threshold pressure for actuation of the control valve 30; if the threshold pressure is established at 100 pounds per square inch, the relief valve actuation pressure may be established at approximately 125 pounds per square inch.

The two tanks 20 and 21 may be filled simultaneously or in sequence. If the tanks are to be filled simultaneously, the separate inlet and outlet valves 28 and 29 may be eliminated from the system and the tank 21 may be connected to the line valves 26 and 27; in an arrangement of this kind, the bleeder valve 33 may also be omitted. The arrangement shown in Fig. 1, however, permits independent control of the two storage tanks 20 and 21. The two storage tanks may be filled simultaneously or separately and each may be drained independently of the other. Thus, if tank 20 is filled with gas at a relatively high pressure and tank 21 is empty, the valves 28 and 29 may be opened to fill tank 21 without in any way affecting the sealing action of the valves 26 and 27, since the actuating pressure which holds valves 28 and 29 open during the conversion process is very much lower than normal storage pressures for the tank 20. Of course, both tanks may be filled at the same time if the conversion process is initiated with all of the valves 26—28 open and tank 20 may be filled at a time when tank 21 is already filled with gas under relatively high pressure.

After the tanks 20 and 21 have been filled and the converter shell 10 has been disconnected from the storage tanks by the closing of the valves 26—29, the shell 10 may be opened and the relatively low-pressure gas contained therein may be exhausted to the atmosphere. The converter is then in condition to receive a new charge of solid carbon dioxide whenever it is desired to refill the two storage tanks. It seldom happens that the solid carbon dioxide is delivered to the converter at precisely the time that the storage tanks become exhausted. Moreover, in many applications, a substantial gas pressure is required in order to permit effective use of the gas; consequently, it is desirable to afford some means of refilling the storage tanks after a substantial amount of gas has been removed therefrom but before they are completely exhausted. Thus, in a given operation, in which the storage tank pressure may be of the order of 1000 pounds per square inch when the tanks are full, it may be desirable to refill the tanks whenever their internal pressure approaches a relatively low value such as 200 pounds per square inch but before they are exhausted below the triple-point pressure of 75 pounds per square inch. On the other hand, effective operation of the converter is dependent upon equalization of the pressures within the storage and converter tanks during the conversion process, since this pressure must be maintained approximately at the triple-point pressure throughout the time that the solid material is converted to fluid phase and transmitted to the storage tank or tanks.

The equalization of pressure within the converter shell 10 and the storage tank 20, for example, may be accomplished simply by opening the outlet valve 86 of the storage tank to the atmosphere before the conversion process is initiated, thereby equalizing the pressure in the tank 20 with the internal pressure of the converter shell. This is an uneconomical procedure, however, since it may result in the exhaustion of a substantial amount of carbon dioxide gas to the atmosphere. The requisite pressure equalization is achieved much more efficiently and economically by the manually operated bleeder valve 32 connected in parallel with valve 26.

Assuming that the internal pressure of tank 20 is 200 pounds per square inch at the time that the tank is to be refilled, the converter shell 10 is first opened and charged with solid carbon dioxide while the valves 26 and 27 are left in their closed position, being held closed by the relatively high internal pressure of the tank 20 acting upon the pistons of the line valves (see Fig. 2). After the charge of solid carbon dioxide has been deposited in the converter shell and the converter shell has been sealed, the valve 32 is opened, thereby interconnecting the tank 20 with the shell and equalizing the pressure within these two containers. The resultant increase in pressure in the container 10 of course causes a corresponding increase in the pressure on the outlet side of the control valve 30 and may be sufficient to close that valve. As soon as enough of the vapor from the tank 20 has been condensed on the solid carbon dioxide in the converter shell 10 to reduce the system pressure approximately to the triple-point value, however, the valve 30 returns to its normal open condition. As a consequence, the pressure in the valve section 42 of valve 26 is equalized with that in sections 40 and 41, restoring the valve 26 to its normal open condition as illustrated in Fig. 2. Valve 27 is similarly opened and remains open during the conversion process. Manual valve 32 may then be closed and the converter continues its operation until automatically shut down as described hereinabove. It is not necessary to afford an automatic closing arrangement for the valve 32, since it may remain open throughout the conversion process without disturbing the operation of the system in any way. If, by chance, the operator should fail to close valve 32 before the conversion of the solid material to fluid phase is completed, the relief valve 85 affords adequate protection for the low pressure container 10 and prevents damage to that container. A suitable warning device may be connected to the relief valve 85 for actuation thereby if desired. The bleeder valve 33 is of course employed in the same manner with respect to tank 21 to initiate the conversion operation when the internal pressure of that tank is substantially higher than the triple-point pressure of the material to be converted.

The converter shell 10 may be manufactured much more economically than previously known converter arrangements, since it is not required to withstand the ultimate storage pressure; in a carbon dioxide converter, shell 10 need not withstand an internal pressure substantially greater than 125 pounds per square inch absolute. This is of particular importance in relation to the closure required for the opening 11 through which the converter is charged with solid material. The relatively large, expensive, and cumbersome closure devices required by previously known converter arrangements are eliminated entirely and a relatively simple sealing arrangement capable of withstanding only relatively low pressures of the order of 125 pounds per square inch may be employed. The tank 10 itself may of course be constructed much more economically than the high pressure converter tanks of previously known systems, since it is not required to withstand the relatively high pressures at which the gas is stored.

In an extremely small converter, the location of the inlet opening for the return gas conduit 23 is not particularly critical. In converters of substantial size, however, it is important that the opening 34 connecting the conduit to tank 10 be located closely adjacent the outlet opening 24 leading to the liquid drain line 22. If the return gas inlet 34 in tank 10 is located at a substantial distance from the liquid outlet 24, the cold air present in the converter tank 10 may delay condensation of the relatively warm carbon dioxide gas for a period of time sufficient to allow the build up of a substantial internal pressure within the converter system. Consequently, the control valve 30 may be actuated prematurely, closing off the valves 26—29, and preventing completion of the conversion operation. Accordingly, the inlet 34 for the conduit 23 into the converter tank 10 should be located immediately adjacent the liquid drain outlet, as illustrated in Fig. 1.

The storage tanks 20 and 21 must of course be constructed to withstand the relatively high pressures developed when completely filled with the carbon dioxide or other material being stored. These tanks, however, may still be considerably more economical in construction than is possible with previously known arrangements, since they require no large sealed openings for the admission of solid material thereinto. As noted hereinabove, it is not necessary to delay filling of one of the tanks, in a multi-tank arrangement such as shown in Fig. 1, until the other tank is exhausted; the converter system permits completely independent operation of two or more storage tanks. The orientation of the converter shell 10 is not critical; the converter tank position may vary from an acute angle with respect to the horizontal, as illustrated, to a perpendicular position without adversely affecting operation of the converter system so long as the liquid outlet opening 24 is positioned to drain substantially all of the liquified carbon dioxide or other material from the converter shell into the storage tank or tanks.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. The method of converting carbon dioxide or like material from solid to fluid phase which comprises the following steps: depositing the solid material to be converted in a first container; draining the material in liquid phase, as it melts, into a second container; draining vaporized material from the second container to refrigerate the second container and maintain both containers at the triple-point pressure and temperature of the material until all of the solid material is converted to fluid phase; and sealing off the second container from the first when the pressure in the containers exceeds a predetermined threshold value only slightly higher than the triple-point pressure of the material, leaving the major portion of the material stored in the second container in fluid phase.

2. The method of converting carbon dioxide or like material from solid to fluid phase which comprises the following steps: depositing the solid material to be converted in a first container; draining the material in liquid form phase by gravity, as it melts, into a second container; draining vaporized material from the second container to refrigerate the second container and maintain both containers at the triple-point pressure and temperature of the material until all of the solid material is converted to fluid phase; and sealing off the second container from the first when the pressure in the containers exceeds a predetermined threshold value only slightly higher than the triple-point pressure of the material, leaving the major portion of the material stored in the second container in fluid phase.

3. The method of converting carbon dioxide or like material from solid to fluid phase which comprises the following steps: depositing the solid material to be converted in a first container; draining the material in liquid phase, as it melts, into a second container; returning vaporized material from the second container to the first to condense on any solid material remaining therein, thereby refrigerating the second container and maintaining both containers at the triple-point pressure and temperature of the material until all of the solid material is converted to fluid phase; and sealing off the second container from the first when the pressure in the containers exceeds a predetermined threshold value higher than the triple-point pressure of the material, leaving the major portion of the material stored in the second container in fluid phase.

4. The method of converting carbon dioxide or like material from solid to fluid phase which comprises the following steps: depositing the solid material to be converted in a first container; draining the material in liquid phase, as it melts, through a first conduit into a second container; returning vaporized material from the second container to the first container through a second conduit to condense on any solid material remaining therein, thereby refrigerating the second container and maintaining both containers at the triple-point pressure and temperature of the material until all of the solid material is converted to fluid phase; and sealing off the second container from the first when the pressure in the containers exceeds a predetermined threshold value only slightly higher than the triple-point pressure of the material, leaving the major portion of the material stored in the second container in fluid phase.

5. The method of converting carbon dioxide or like material from solid to fluid phase which comprises the following steps: depositing the solid material to be converted in a first container; draining the material in liquid phase by gravity, as it melts, through a first conduit into a second container; returning vaporized material from the second container, through a second conduit, to a point within the first container closely adjacent the outlet opening therein to condense on any solid material remaining therein, thereby refrigerating the second container and maintaining both containers at the triple-point pressure and temperature of the material until all of the solid material is converted to fluid phase; and sealing off the second container from the first when the pressure in the first container exceeds a predetermined threshold value only slightly higher than the triple-point pressure of the material, leaving the major portion of the material stored in the second container in fluid phase.

6. A solid-to-fluid converter for carbon dioxide or like material comprising: a low-pressure container for receiving a charge of solid material and capable of withstanding internal pressure only slightly higher than the triple-point pressure of the material; a high-pressure fluid storage tank capable of withstanding an internal pressure very much higher than said triple-point pressure; a pair of conduits interconnecting the low-pressure container and the storage tank, one of said conduits being adapted to drain liquid material from the low-pressure container to the storage tank; a pair of valves, individually interposed in the conduits, each actuatable from a normal open condition to a closed condition; and means comprising a pressure-responsive control valve connected to said low-pressure container and to each of said pair of valves for actuating the valves from open condition to closed condition in response to an increase in pressure within the low-pressure container to a predetermined threshold value which is effectively higher than the triple-point pressure of the material to be stored but lower than the internal pressure limit of said container.

7. A solid-to-fluid converter for carbon dioxide or like material comprising: a low-pressure container for receiving a charge of solid material; a high-pressure fluid storage tank; a pair of conduits interconnecting the low-pressure container and the storage tank, one of said conduits comprising a liquid drain conduit adapted to drain liquid material from the low-pressure container to the storage tank and the other conduit comprising a gas return line for returning said material in vapor phase from the storage tank to the low-pressure container, the openings of the conduits into the low-pressure container being located closely adjacent each other; a pair of valves, individually interposed in the conduits, each actuatable from a normal open condition to a closed condition; and means comprising a pressure-responsive control valve connected to said low-pressure container and to each of said pair of valves for actuating the valves from open condition to closed condition in response to an increase in pressure within the low-pressure container to a predetermined threshold value effectively exceeding the triple-point pressure of the material to be stored by a relatively small amount.

8. A solid-to-fluid converter for carbon dioxide or like material comprising: a low-pressure container for receiving a charge of solid material; a high-pressure fluid storage tank; a pair of conduits interconnecting the low-pressure container and the storage tank, one of said conduits being adapted to drain liquid material from the low-pressure container to the storage tank; a pair of fluid pressure actuated line valves, individually interposed in the conduits, each actuatable from a normal open condition to a closed condition; and means comprising a pressure-responsive control valve connected to said low-pressure container and to each of said line valves for actuating the line valves from open condition to closed condition in response to an increase in pressure within the low-pressure container to a predetermined threshold value effectively exceeding the triple-point pressure of the material to be stored by a relatively small amount.

9. A solid-to-fluid converter for carbon dioxide or like material comprising: a low-pressure container for receiving a charge of solid material; a high-pressure fluid storage tank; a pair of conduits interconnecting the low-pressure container and the storage tank, one of said conduits being adapted to drain liquid material from the low-pressure container to the storage tank; a pair of line valves, individually interposed in the conduits, said line valves each including an inlet section, an outlet section, an actuation section, a piston separating the actuation section from the inlet and outlet sections, and valve means connected to said piston and interposed between the inlet and outlet sections, said valve means being actuatable from a normal open condition to a closed condition by movement of said piston in response to a decrease in fluid pressure in the actuation section relative to one of the other sections; and means, comprising a snap-action control valve connected to the low-pressure container and to the actuation sections of said line valves, for actuating the line valves from open condition to closed condition in response to an increase in pressure within the low-pressure container to a predetermined threshold value effectively exceeding the triple-point pressure of the material to be stored by a relatively small amount.

10. A solid-to-fluid converter for carbon dioxide or like material comprising: a low-pressure container for receiving a charge of solid material; a high-pressure fluid storage tank; a pair of conduits interconnecting one end of the low-pressure container with the storage tank, one of said conduits being adapted to drain liquid material from the low-pressure container to the storage tank and the other being adapted to return vaporized material from the storage tank to the low-pressure container to condense on the solid material therein; a pair of line valves, individually interposed in the conduits, each actuatable from a normal open condition to a closed condition; means comprising a pressure-responsive control valve connected to said low-pressure container and to each of said pair of line valves for actuating the valves from normal open condition to closed condition in response to an increase in pressure within the low-pressure container to a predetermined threshold value effectively exceeding the triple-point pressure of the material to be stored by a relatively small amount; and a manually operable bleeder valve bypassing one of said line valves.

11. A solid-to-fluid converter for carbon dioxide or like material comprising: a low-pressure container for receiving a charge of solid material; a plurality of high-pressure fluid storage tanks; a pair of conduits interconnecting the low-pressure container and each of the storage tanks, one of said conduits being adapted to drain liquid material from the low-pressure container to the storage tank; a plurality of line valves, individually interposed in the conduits between the low-pressure container and each of the storage tanks and each actuatable from a normal open condition to a closed condition; and means comprising a pressure-responsive control valve connected to said low-pressure container and to each of said line valves for actuating the line valves from open condition to seal off the tanks from the low-pressure container to closed condition in response to an increase in pressure within the low-pressure container to a predetermined threshold value effectively exceeding the triple-point pressure of the material to be stored by a relatively small amount.

12. A solid-to-fluid converter for carbon dioxide or like material comprising: a low-pressure container for receiving a charge of solid material; a high-pressure fluid storage tank; a pair of conduits interconnecting the low-pressure container and the storage tank, one of said conduits being adapted to drain liquid material from the low-pressure container to the storage tank; a pair of valves, individually interposed in the conduits, each actuatable from a normal open condition to a closed condition; means comprising a pressure-responsive control valve connected to said low-pressure container and to each of said pair of valves for actuating the valves from open condition to closed condition in response to an increase in pressure within the low-pressure container to a predetermined threshold value effectively exceeding the triple-point pressure of the material to be stored by a relatively small amount; and a relief valve, connected to the low pressure container, said relief valve having an actuation pressure effectively exceeding the actuating means threshold pressure.

13. A solid-to-fluid converter for carbon dioxide comprising: a low-pressure container for receiving a charge of solid material and capable of withstanding an internal pressure of the order of 125 pounds per square inch absolute; a high-pressure fluid storage tank capable of withstanding an internal pressure of the order of 1000 pounds per square inch absolute; a pair of conduits interconnecting the low-pressure container and the storage tank, one of said conduits being adapted to drain liquid material from the low-pressure container to the storage tank; a pair of valves, individually interposed in the conduits, each actuatable from a normal open condition to a closed condition; and means comprising a pressure-responsive control valve connected to said low-pressure container and to each of said pair of valves for actuating the valves from open condition to closed condition in response to an increase in pressure within the low-pressure container to a predetermined threshold of approximately 100 pounds per square inch absolute.

References Cited in the file of this patent

UNITED STATES PATENTS

| | | |
|---|---|---|
| 1,727,865 | Dehottay | Sept. 10, 1929 |
| 1,760,953 | Martin | June 3, 1930 |
| 1,938,034 | Lundy | Dec. 5, 1933 |
| 1,970,058 | Ruff | Aug. 14, 1934 |
| 2,406,284 | Fitch | Aug. 20, 1946 |
| 2,500,249 | Hansen | Mar. 14, 1950 |
| 2,543,170 | Hill | Feb. 27, 1951 |
| 2,576,985 | Wildhack | Dec. 4, 1951 |
| 2,610,859 | Wilcox | Sept. 16, 1952 |
| 2,670,605 | Van Zandt et al. | Mar. 2, 1954 |
| 2,725,722 | Ahlstrand et al. | Dec. 6, 1955 |
| 2,764,174 | Wilson | Sept. 25, 1956 |

FOREIGN PATENTS

| | | |
|---|---|---|
| 539,814 | Great Britain | Sept. 25, 1941 |